(12) United States Patent
Osaki

(10) Patent No.: US 8,403,414 B2
(45) Date of Patent: Mar. 26, 2013

(54) POWER SEAT DRIVE DEVICE

(75) Inventor: Takuya Osaki, Sakura (JP)

(73) Assignee: Fujikura Ltd., Tokyo (JP)

( * ) Notice: Subject to any disclaimer, the term of this patent is extended or adjusted under 35 U.S.C. 154(b) by 723 days.

(21) Appl. No.: 12/596,340

(22) PCT Filed: Apr. 15, 2008

(86) PCT No.: PCT/JP2008/057349
§ 371 (c)(1),
(2), (4) Date: Feb. 3, 2010

(87) PCT Pub. No.: WO2008/133111
PCT Pub. Date: Nov. 6, 2008

(65) Prior Publication Data
US 2010/0133885 A1 Jun. 3, 2010

(30) Foreign Application Priority Data
Apr. 16, 2007 (JP) .................. 2007-107197

(51) Int. Cl.
*A47C 1/00* (2006.01)
*A61G 15/00* (2006.01)
*B60N 2/00* (2006.01)
*B60N 2/02* (2006.01)

(52) U.S. Cl. ........ 297/311; 297/313; 297/353; 340/665; 340/667; 180/271; 307/9.1

(58) Field of Classification Search ............ 340/667, 340/665; 307/9.1, 10.1; 180/271; 297/311, 297/313, 353, 354.1
See application file for complete search history.

(56) References Cited

U.S. PATENT DOCUMENTS

| 4,852,934 A | 8/1989 | Yasuda et al. |
| 5,525,843 A | 6/1996 | Howing |
| 5,864,105 A * | 1/1999 | Andrews ............ 307/10.1 |
| 6,523,417 B1 * | 2/2003 | Donahue et al. .......... 73/800 |
| 7,237,847 B2 * | 7/2007 | Hancock et al. ...... 297/452.56 |
| 7,239,096 B2 * | 7/2007 | Hancock et al. ............ 318/59 |
| 7,808,394 B2 * | 10/2010 | Nathan et al. ............ 340/667 |
| 2006/0255920 A1 | 11/2006 | Maeda et al. |

FOREIGN PATENT DOCUMENTS

DE 10 2004 037914 A1 3/2006
EP 0 191 272 A1 8/1986
(Continued)

OTHER PUBLICATIONS

International Search Report for PCT/JP2008/057349, mailing date of Aug. 5, 2008.
(Continued)

*Primary Examiner* — Eric M Blount
(74) *Attorney, Agent, or Firm* — Westerman, Hattori, Daniels & Adrian, LLP

(57) ABSTRACT

A power seat drive device (100) comprises a sense electrode (10) provided in the back portion (102) of a power seat (101), and a controller (20) operative to control movement of the power seat (101) based on a sense signal from the sense electrode (10). The controller (20) decelerates the speed of movement and provides a warning sound when the proximity distance between the sense electrode (10) and a human body (108) becomes short so as to exceed a decision voltage (Vth1). In addition, the controller stops the movement of the power seat (101) when the proximity distance becomes much shorter so as to exceed a decision voltage (Vth2).

8 Claims, 3 Drawing Sheets

FOREIGN PATENT DOCUMENTS

| | | |
|---|---|---|
| EP | 0 755 823 A2 | 1/1997 |
| FR | 2 740 744 A1 | 5/1997 |
| JP | 63-141840 A | 6/1988 |
| JP | 5-006191 Y2 | 2/1993 |
| JP | 7-251657 A | 10/1995 |
| JP | 9-509118 A | 9/1997 |
| JP | 2007-022153 A | 2/2007 |
| WO | 95/21752 A1 | 8/1995 |

OTHER PUBLICATIONS

Notification of Transmittal of Translation of the International Preliminary Report on Patentability (Form PCT/IB/338) of International Application No. PCT/JP2008/057349 mailed Jan. 21, 2010 with Forms PCT/IPEA/409.

Supplementary European Search Report dated Feb. 21, 2011, issued in corresponding European Patent Application No. 08740435.6.

* cited by examiner

POWER SEAT DRIVE DEVICE

TECHNICAL FIELD

The present invention relates to a power seat drive device for motor vehicles and so forth, and more particularly to a power seat drive device capable of improving safety.

BACKGROUND ART

Power seat drive devices for driving a power seat provided on the floor in a motor vehicle may include those disclosed in the following Patent Document 1 and Patent Document 2 as known in the art. The power seat drive device disclosed in Patent Document 1 comprises a ring member attached to a lead screw that rotates in accordance with a power seat motor; a stopper member mounted on the ring member on the lead screw; and a nut member fixed to the seat and mated with the lead screw so that it can move on the lead screw until it impinges on the stopper member.

The power seat drive device can be configured in a reduced number of process steps, with no damage to the lead screw, an excellent appearance after assembly, and a compact exterior of the entire, as known.

The vehicular seat disclosed in Patent Document 2 comprises a common motor for driving the power seat device and a power seat belt device; a seat switch for selecting the use of the power seat device or the power seat belt device; and a changing means for transmitting the power of the motor to either a seat slide mechanism or a retractor changed in accordance with switched state of the seat switch.

The vehicular seat switches between the transmission paths of the drive force to the power seat device and to the power seat belt device to drive these with the common motor, thereby reducing the number of the drive means to reduce the cost. In addition, it facilitates the layout around the seat for installing the motor, and achieves weight reduction, as known.

[Patent Document 1] JP 7-251657A
[Patent Document 2] JP 2007-22153A

DISCLOSURE OF THE INVENTION

Problem to be Solved by the Invention

The power seat drive device and the vehicular seat of the prior art as described above are structured to adjust the longitudinal movement and the tilt of the seat with the motor. In this case, even if another seat locates in the rear, the operation of the power seat can not be stopped structurally until it reaches a certain position, or until the operation of the seat switch is stopped, regardless of the state of the rear seat.

Therefore, when the power seat is operated without confirming the state of a passenger (human) sitting on the rear seat, the power seat may impinge on the passenger and lead to an unexpected accident or injury possibly as a problem.

The present invention has been made in consideration of such the problem and has an object to provide a power seat drive device capable of controlling operation of a power seat, such as the sliding movement and the slanting movement of the power seat to the rear, to improve safety of the power seat.

Means to Solve the Problem

The present invention provides a power seat drive device for driving a power seat, comprising: a sense electrode operative to sense the proximity of a human body to the rear of the power seat; and a controller operative to control operation of the power seat based on a sense signal from the sense electrode.

The power seat drive device according to the present invention thus configured can control operation of the power seat, where a human body locates in the rear of the power seat, based on the interval (proximity distance) between the human body and the power seat. Therefore, it is possible to effectively prevent an accident and the like, which may be caused when the power seat moves closer to the human body in the rear more than required or makes contact with the human body, and thus improve safety of the power seat.

The sense electrode may be provided in the back portion of the power seat. The controller may be configured to control the power seat so as to stop at least one of the sliding movement of the power seat to the rear and the slanting movement of the back portion to the rear where the capacitance indicated by the sense signal received from the sense electrode exceeds a first threshold previously determined.

The controller may be configured to control the power seat so as to decelerate the speed of movement of at least one of the sliding movement and the slanting movement where the capacitance exceeds a second threshold previously determined lower than the first threshold.

The controller may be configured to provide an informing means for informing the user of the state of the power seat to cause the informing means with a control signal to emit a warning sound where the capacitance exceeds a second threshold previously determined lower than the first threshold. In this case, the controller may be configured to apply the control signal to cause the informing means to emit the warning sound certain times or for a certain time.

The controller may be configured to control the power seat so as to permit only at least one of the sliding movement of the power seat to the front and the slanting movement of the back portion to the front until the capacitance becomes lower than a second threshold previously determined lower than the first threshold.

The controller may further include a conversion circuit operative to convert the sense signal based on the capacitance into a voltage. The controller may be provided in the back portion or the seat portion of the power seat. The power seat drive device may further comprise a drive means for achieving the movement of the power seat on the basis of the control of the controller.

Effect of the Invention

The present invention is thus possible to provide a power seat drive device capable of controlling operation of a power seat to improve safety of the power seat.

THE BEST MODE FOR CARRYING OUT THE INVENTION

A preferred embodiment associated with the power seat drive device according to the present invention will now be described with reference to the accompanying drawings.

FIG. 1 is a block diagram showing an example of the general configuration of a power seat drive device according to an embodiment of the present invention.

FIG. 2 is a brief rear view showing an example of a power seat with the same power seat drive device mounted thereon.

FIG. 3 is a block diagram showing an example of the inner configuration of a controller in the same power seat drive device.

FIG. 4 is a block diagram showing an example of the inner configuration of a drive circuit operable in engagement with the same power seat drive device.

FIG. 5 is an illustrative view showing a correlation between the capacitance and the rearward distance in the same power seat drive device.

As shown in FIGS. 1 and 2, the power seat drive device 100 is a device provided in a power seat 101 mounted on a vehicle, for example, to achieve the sliding movement and the slanting movement of the entire power seat 101 and a back portion 102 and is mainly configured as follows.

Namely, the power seat drive device 100 is provided inside the back portion 102 of the power seat 101 at a location close to the rear. It comprises a sense electrode 10 operative to sense the proximity state of a human body 108 sitting on a rear seat 109 located in the rear of the power seat 101, and a controller 20 similarly provided inside the back portion 102 and operative to control the movement of the power seat 101 based on a sense signal from the sense electrode 10.

The power seat drive device 100 in this example comprises a drive means operative to actually shift the power seat 101 based on a control signal from the controller 20. The drive means may include a seat ECU (Electric Control Unit) 30 operative to exert electric control over the entire power seat 101, and a drive circuit 40 operative to drive the power seat 101.

The drive circuit 40 includes a motor 41 for sliding a seat portion 103 of the power seat 101, and a motor 42 for slanting the back portion 102 as shown in FIGS. 1 and 4. The controller 20, the seat ECU 30 and the drive circuit 40 are electrically connected with each other via electric wires 48, 49.

The sense electrode 10 is formed in the size and shape sufficient to sense the proximity state of the human body 108 sitting on the rear seat 109 when it is provided in the back portion 102. In this example, it is formed in the shape of an elliptical doughnut as shown in FIG. 2. The sense electrode 10 is composed of a conductive member such as a membrane circuit, a flexible printed circuit (FPC), an electric wire and a copper plate. It provides the controller 20 with a sense signal indicative of the capacitance associated with the distance between the back portion 102 and the human body 108.

The controller 20 may include a C-V conversion circuit 21 connected to the sense electrode 10, and comparators 22, 23 operative to compare the output voltage from the C-V conversion circuit 21 with decision voltages Vth1, Vth2 as shown in FIG. 3. These C-V conversion circuit 21 and comparators 22, 23 are formed on an FPC or a RPC (Rigid Printed Circuit) structurally.

The C-V conversion circuit 21 has a function of converting the capacitance C between the human body 108 and the sense electrode 10 into a voltage and reads a variation in the capacitance C based on the sense signal from the sense electrode 10 to convert the variation into a voltage. The comparator 22 compares the output voltage from the C-V conversion circuit 21 with a first threshold previously determined, that is, the decision voltage Vth1, and provides the seat ECU 30 with a stop signal to stop the movement of the power seat 101 as the control signal where the output voltage is higher than the decision voltage Vth1.

The comparator 23 compares the output voltage from the C-V conversion circuit 21 with a second threshold previously determined to have a lower value than the decision voltage Vth1, that is, the decision voltage Vth2, and provides the seat ECU 30 with a warning signal as the control signal to cause the seat ECU to emit a warning sound that gives a warning of the proximity of the power seat 101 to the human body 108 where the output voltage is higher than the decision voltage Vth2.

The seat ECU 30 controls the drive circuit 40, for example, based on the above-described control signal from the controller 20. Namely, as shown in FIG. 4, the drive circuit 40 includes, in addition to the above-described motors 41, 42, a relay 43 of the NC (Normally Closed) type, a relay 44 of the NO (Normally Open) type, an operation switch 45 for sliding the power seat 101, an operation switch 46 for slanting the back portion 102, and a speaker 47 serving as the informing means for informing the user of the state of the power seat 101. The controller 20 and the seat ECU 30 may each comprise a control unit including a CPU or the like, not shown.

The seat ECU 30, on receipt of the stop signal from the controller 20, brings the contact of the relay 43 into the open state, regardless of the operation of the operation switch 45 or the operation switch 46, to cut off the power supplied from the power source 48 to the motors 41, 42, thereby stopping the sliding movement of the power seat 101 and the slanting movement of the back portion 102. The operation switches 45, 46 may comprise a mechanical switch of the push-down or push-up type or an electric switch with a seat position memory function.

The seat ECU 30, on receipt of the warning signal from the controller 20, brings the contact of the relay 43 into the closed state, to allow the power to be supplied from the power source 48 to the speaker 47, thereby causing the speaker to emit a warning sound certain times or for a certain time, and controls the motors 41, 42 to drop the speed of movement of the sliding movement of the power seat 101 and the slanting movement of the back portion 102 for deceleration.

Namely, in the power seat drive device 100 in this example, if the controller 20 determines that the proximity distance between the human body 108 and the sense electrode 10 is sufficient as shown in FIG. 5, the power seat 101 is permitted to slide freely in the longitudinal direction and the back portion 102 to slant freely in the longitudinal direction in accordance with the operation of the operation switches 45, 46.

On the other hand, if the controller 20 determines that the proximity distance between the human body 108 and the sense electrode 10 becomes short so as to exceed the decision voltage Vth2, the speaker 47 is driven to emit the warning sound indicative of the warning on the proximity, and the motors 41, 42 are controlled to decelerate the speed of movement of the sliding movement of the power seat 101 to the rear and the slanting movement of the back portion 102 to the rear regardless of the operation of the operation switches 45, 46.

If the operation switch 45, 46 is being operated at this time, the power seat 101 or the back portion 102 continues the movement to the rear apparently in the decelerated condition though this movement is not based on the operation of the operation switch 45, 46 but rather automatically controlled by the controller 20 for relieving a sharp stop.

If the controller 20 determines that the proximity distance between the human body 108 and the sense electrode 10 becomes much shorter so as to exceed the decision voltage Vth1, the proximity distance between the human body 108 and the sense electrode 10 is held so as not to influence on the human body 108 and, in this state, the motors 41, 42 are controlled to stop the sliding movement of the power seat 101 to the rear and the slanting movement of the back portion 102 to the rear regardless of the operation of the operation switches 45, 46.

Thus, in the power seat drive device 100 in this example, when a human body 108 locates in the rear of the power seat 101, the controller 20 can control the movement of the power seat 101 (the sliding movement and the slanting movement) based on the interval (proximity distance) between the human body 108 and the sense electrode 10 provided in the back portion 102 of the power seat 101.

Therefore, it is possible to effectively prevent an accident and the like, which may be caused when the power seat 101 moves closer to the human body 108 more than required or makes contact with the human body as a result of continuous operation or careless operation of the operation switches 45, 46, and thus improve safety of the power seat 101.

As described above, the power seat drive device 100 according to the present embodiment can control the operation of the power seat 101 so as not to influence on the human body 108 in the rear and therefore can improve safety of the power seat 101. In the above-described embodiment, the power seat 101 mounted on a vehicle is described by way of example though any types of the power seat may be included if they can adjust the position or tilt thereof in a motor-operated manner, such as motor-operated massage chairs and barber or medical chairs. The sense electrode 10 and the controller 20 are arranged in the back portion 102 of the power seat 101 structurally though the sense electrode 10 may be arranged in the seat portion 103 or in both the back portion 102 and the seat portion 103. The controller 20 may be arranged similarly.

INDUSTRIAL AVAILABILITY

The present invention is useful for improving safety in a power seat drive device for driving a power seat mounted on a vehicle and so forth.

DESCRIPTION OF REFERENCE NUMERALS

Figure 1:
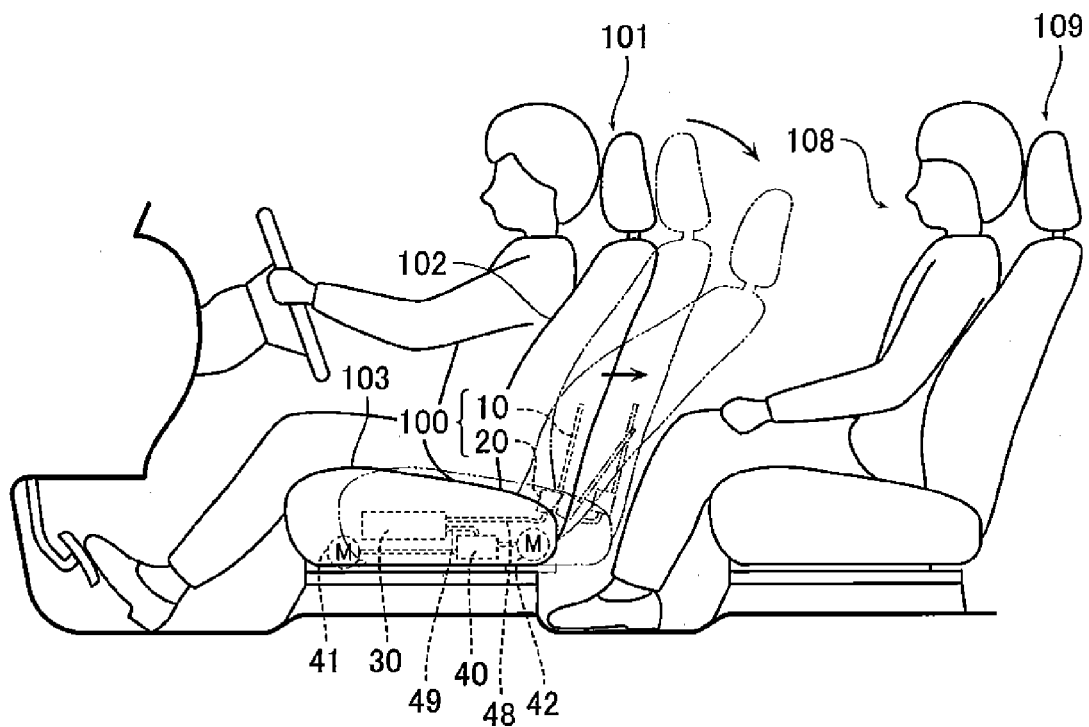
FIG. 1 A block diagram showing an example of the general configuration of a power seat drive device according to an embodiment of the present invention.
Figure 2:
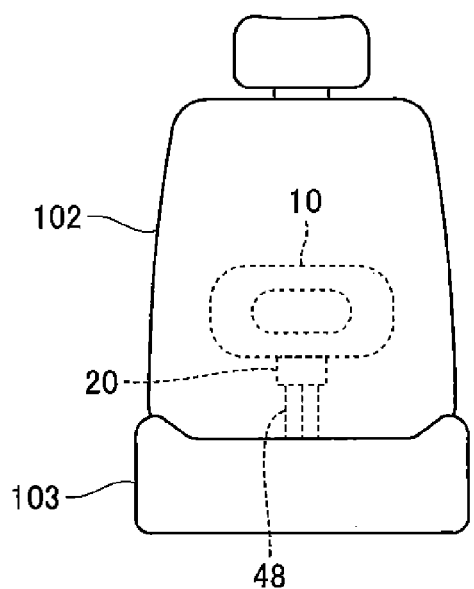
FIG. 2 A brief rear view showing an example of a power seat with the same power seat drive device mounted thereon.
Figure 3:
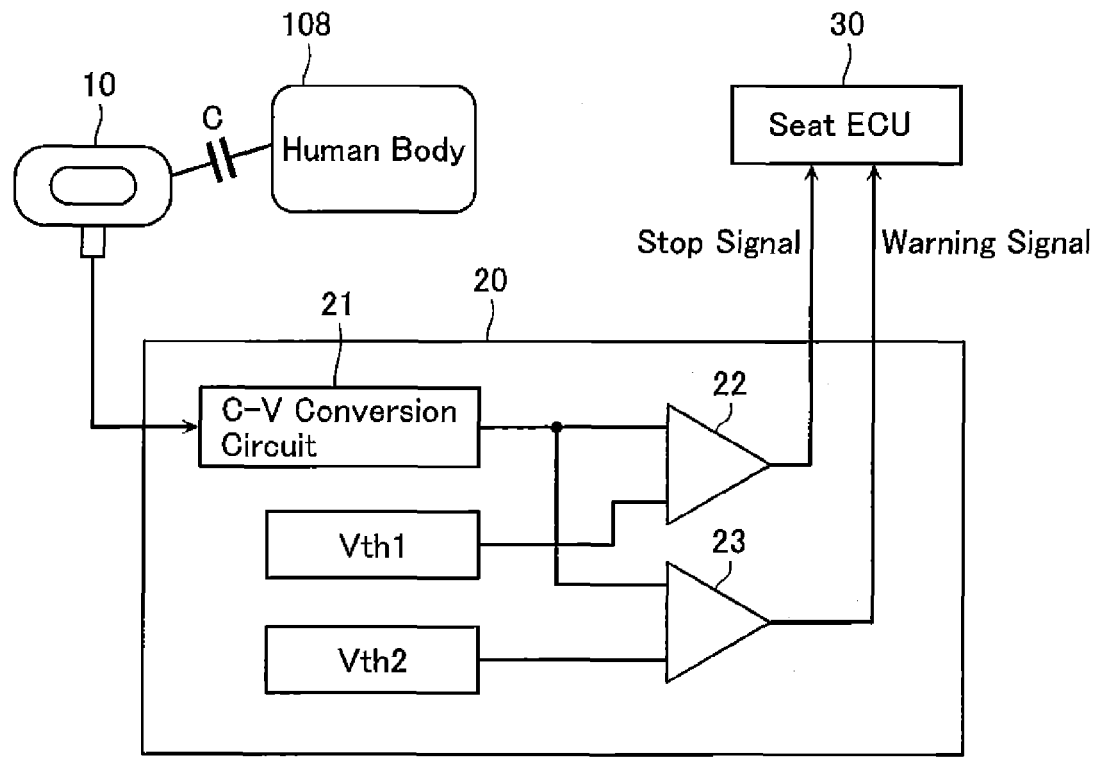
FIG. 3 A block diagram showing an example of the inner configuration of a controller in the same power seat drive device.
Figure 4:
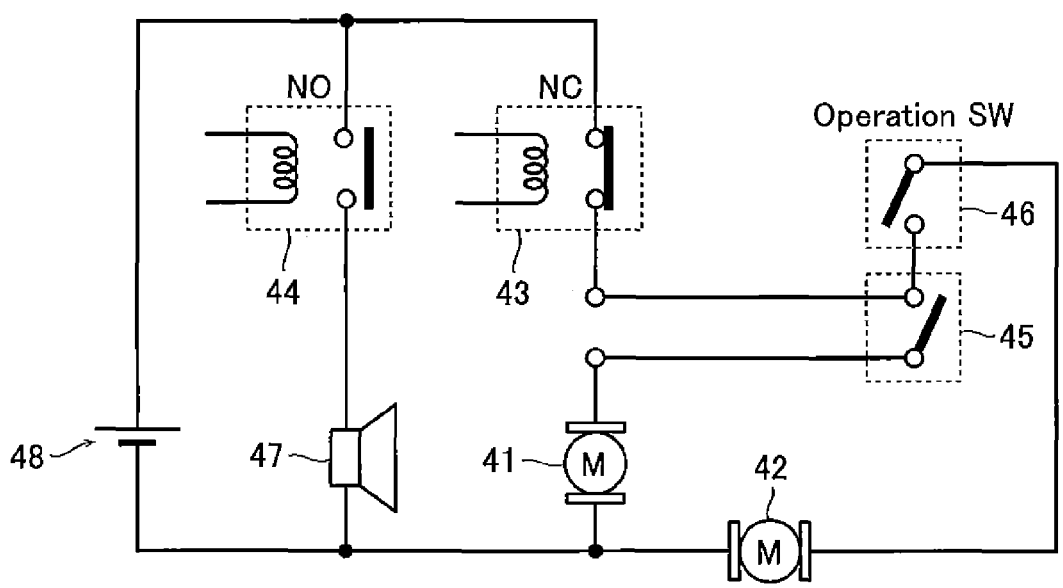
FIG. 4 A block diagram showing an example of the inner configuration of a drive circuit operable in engagement with the same power seat drive device.
Figure 5:
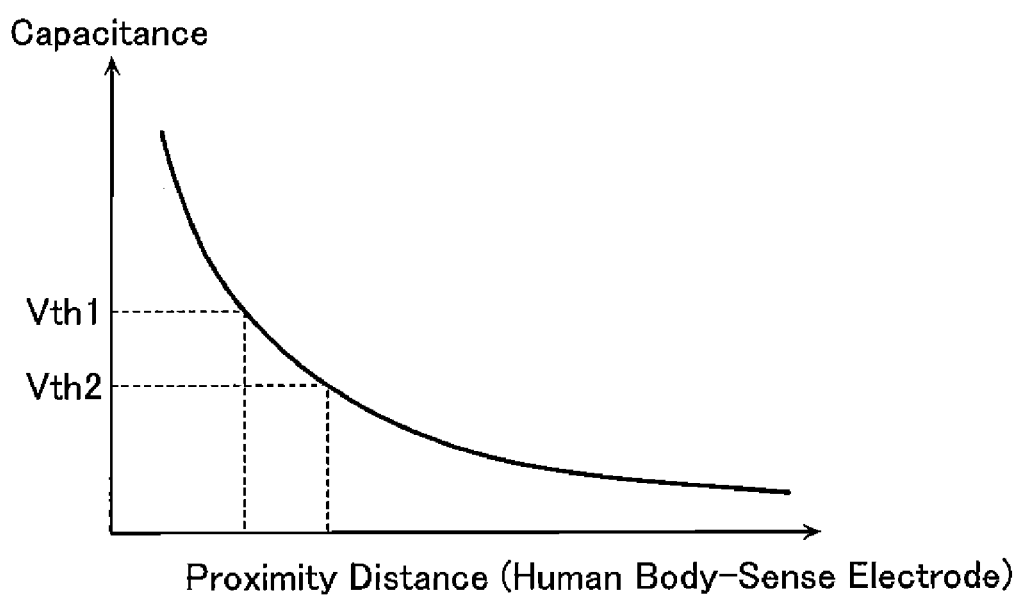
FIG. 5 An illustrative view showing a correlation between the capacitance and the rearward distance in the same power seat drive device.

10: Sense Electrode, 20: Controller, 21: C-V Conversion Circuit, 22, 23: Comparators, 30: Seat ECU, 40: Drive Circuit, 43, 44: Relays, 45, 46: Operation Switches, 47: Speaker.

The invention claimed is:

1. A power seat drive device for driving a power seat, comprising:
   a sense electrode operative to sense the proximity of a human body to the rear of the power seat; and
   a controller operative to control operation of the power seat based on a sense signal from the sense electrode,
      wherein the sense electrode is provided in the back portion of the power seat,
      wherein the controller controls the power seat so as to stop at least one of the sliding movement of the power seat to the rear and the slanting movement of the back portion to the rear where the capacitance indicated by the sense signal received from the sense electrode exceeds a first threshold previously determined.

2. The power seat drive device according to claim 1, wherein the controller controls the power seat so as to decelerate the speed of movement of at least one of the sliding movement and the slanting movement where the capacitance exceeds a second threshold previously determined lower than the first threshold.

3. The power seat drive device according to claim 1, wherein the controller provides an informing means for informing the user of the state of the power seat with a control signal to cause the informing means to emit a warning sound where the capacitance exceeds a second threshold previously determined lower than the first threshold.

4. The power seat drive device according to claim 3, wherein the controller applies the control signal to cause the informing means to emit the warning sound certain times or for a certain time.

5. The power seat drive device according to claim 1, wherein the controller controls the power seat so as to permit only at least one of the sliding movement of the power seat to the front and the slanting movement of the back portion to the front until the capacitance becomes lower than a second threshold previously determined lower than the first threshold.

6. The power seat drive device according to claim 1, the controller further includes a conversion circuit operative to convert the sense signal based on the capacitance into a voltage.

7. The power seat drive device according to claim 1, wherein the controller is provided in the back portion or the seat portion of the power seat.

8. The power seat drive device according to claim 1, further comprising a drive means for achieving the movement of the power seat on the basis of the control of the controller.

* * * * *